(12) United States Patent
Nguyen et al.

(10) Patent No.: US 6,662,873 B1
(45) Date of Patent: Dec. 16, 2003

(54) METHODS AND COMPOSITIONS FOR FORMING PERMEABLE CEMENT SAND SCREENS IN WELLS

(75) Inventors: Philip D. Nguyen, Duncan, OK (US); David L. Brown, Temple, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/013,975

(22) Filed: Dec. 11, 2001

(51) Int. Cl.⁷ .................. E21B 33/138; E21B 43/02
(52) U.S. Cl. .............. 166/276; 166/293; 166/300; 166/309; 106/678; 106/724; 106/738
(58) Field of Search ................. 166/276, 293, 166/300, 309, 278; 106/678, 724, 725, 727, 730, 738, 819, 820, 823

(56) References Cited

U.S. PATENT DOCUMENTS

| | | | |
|---|---|---|---|
| 2,135,909 A | 11/1938 | Monson | 166/21 |
| 2,187,895 A | 1/1940 | Sanders | 166/21 |
| 2,190,989 A | 2/1940 | Johnston | 166/21 |
| 2,193,808 A | 3/1940 | Dieterich | 166/21 |
| 2,288,557 A | 6/1942 | Vollmer | 166/26 |
| 3,044,547 A | 7/1962 | Jarboe, Jr. | 166/12 |
| 3,119,448 A | 1/1964 | Rhoades | 166/12 |
| 3,368,623 A | 2/1968 | Carter et al. | 166/12 |
| 3,605,899 A | 9/1971 | Tate et al. | 166/300 |
| 3,816,151 A | 6/1974 | Podlas | 106/194 |
| 3,862,663 A | 1/1975 | Curtice et al. | 166/276 |
| 5,062,484 A | * 11/1991 | Schroeder, Jr. et al. | 166/278 |
| 5,339,902 A | * 8/1994 | Harris et al. | 166/293 |
| 5,363,916 A | * 11/1994 | Himes et al. | 166/276 |
| 5,372,732 A | * 12/1994 | Harris et al. | 507/217 |
| 5,529,123 A | * 6/1996 | Carpenter et al. | 166/293 |
| 5,981,447 A | * 11/1999 | Chang et al. | 507/271 |
| 6,063,738 A | * 5/2000 | Chatterji et al. | 507/269 |
| 6,202,751 B1 | * 3/2001 | Chatterji et al. | 166/276 |

* cited by examiner

Primary Examiner—Heather Shackelford
Assistant Examiner—John Kreck
(74) Attorney, Agent, or Firm—Robert A. Kent; C. Clark Dougherty, Jr.

(57) ABSTRACT

Methods of forming a permeable cement composition in a well bore adjacent to a fluid producing zone therein and cement compositions for forming permeable cement sand screens in well bores are provided. A cement composition of the invention is comprised of a hydraulic cement, a particulate cross-linked aqueous gel having a size in the range of from about 100 microns to about 3000 microns containing an internal temperature activated breaker, a particulate dehydrated cross-linked aqueous gel having a size in the range of from about 40 microns to about 500 microns containing an internal temperature activated breaker and water present in an amount sufficient to form a slurry.

33 Claims, 1 Drawing Sheet

METHODS AND COMPOSITIONS FOR FORMING PERMEABLE CEMENT SAND SCREENS IN WELLS

BACKGROUND OF THE INVENTION

1. Field of the Invention

The present invention provides methods and compositions for forming permeable cement sand screens in wells to prevent sand from flowing into the well with produced hydrocarbons and other fluids.

2. Description of the Prior Art

Oil, gas and water producing wells are often completed in unconsolidated subterranean formations containing loose or incompetent sand which flows into the well bores with produced fluids. The presence of the sand in the produced fluids rapidly erodes metal tubular goods and other production equipment which often substantially increases the costs of operating the wells.

Gravel packs have heretofore been utilized in wells to prevent the production of sand. Such gravel packs are comprised of a pack of gravel such as graded sand which is placed in the annulus between a perforated or slotted liner or screen and the walls of a well bore in the fluid producing zone. The resulting structure provides a barrier to migrating sand from the producing zone while allowing the flow of produced fluids. Gravel packs have successfully prevented the production of sand with formation fluids, but they often fail and require replacement. For example, gravel packs frequently fail due to the deterioration of the perforated or slotted liner or screen as a result of corrosion or the like. The initial installation of a gravel pack adds considerable expense to the cost of completing a well and the removal and replacement of a failed gravel pack is even more costly.

Thus, there are continuing needs for improved methods of preventing the production of formation sand, fines and the like with produced subterranean formation fluids.

SUMMARY OF THE INVENTION

The present invention provides improved methods and compositions for forming permeable cement sand screens in well bores which meet the needs described above and overcome the deficiencies of the prior art. The methods of the invention are basically comprised of the following steps. A cement composition which can be foamed if required is prepared comprised of a hydraulic cement, a particulate cross-linked aqueous gel having a size in the range of from about 100 microns to about 3000 microns containing an internal temperature activated breaker which causes the gel to break into a liquid, a particulate dehydrated cross-linked aqueous gel having a size in the range of from about 40 microns to about 500 microns containing an internal temperature activated breaker which causes the gel to break into a liquid and water present in an amount sufficient to form a slurry. If the cement composition is foamed, a gas in an amount sufficient to form a foam and a mixture of foaming and foam stabilizing surfactants are included in the cement composition. The cement composition is then placed in a well bore adjacent to a fluid producing zone therein, the cement composition is allowed to set and the particulate cross-linked aqueous gels containing internal temperature activated breakers are allowed to break whereby a permeated set cement composition is formed in the fluid producing zone. An acid solution is then introduced into the well bore into contact with the permeated set cement whereby the acid solution flows through the permeations in the set cement and dissolves any portions of the set cement blocking the permeations.

The permeable set cement in the well bore functions as a sand screen, i.e., the permeable cement allows produced fluids to flow into the well bore, but prevents formation sand and the like from flowing therein. The permeable cement sand screen can completely fill the portion of the well bore adjacent to the fluid producing zone whereby the permeable cement sand screen bonds to the walls of the well bore. The permeable cement sand screen cannot be bypassed and does not readily deteriorate.

In an alternate embodiment of the present invention which is utilized when it is desired to form a permeable cement composition sand screen of high strength and integrity that includes an extension of the well bore therethrough adjacent to an open-hole fluid producing zone below a cased well bore, an expandable slotted pipe is utilized. That is, an expandable slotted pipe is placed in the fluid producing zone below or adjacent to the end of casing in a well bore. If required to provide enough space between the expanded slotted pipe and the walls of the well bore, the well bore below the casing can be enlarged using a reaming or hydrojetting technique prior to placing the expandable slotted pipe in the fluid producing zone. After placement, the slotted pipe is expanded to the internal size of the casing in the well bore. A cement composition of the present invention as described above is then prepared and the cement composition is placed in the well bore adjacent to the fluid producing zone within the expanded slotted pipe therein, between the expanded slotted pipe and the open-hole well bore and within any voids or fractures in the producing zone. The cement composition is allowed to set and the particulate cross-linked aqueous gels containing internal temperature activated breakers to break whereby a permeated set cement composition is formed in the open-hole producing zone. The set permeable cement composition within the expanded slotted pipe is drilled out leaving a high strength permeable cement composition sand screen in the producing zone. Thereafter, an acid solution is introduced by way of the well bore into contact with the permeated set cement whereby the acid solution flows through the permeations in the set cement and dissolves any portions of the set cement blocking the permeations.

The compositions of this invention for forming a permeable cement sand screen in a well bore are basically comprised of a hydraulic cement, a particulate cross-linked aqueous gel having a size in the range of from about 100 microns to about 3000 microns containing an internal temperature activated breaker which causes the gel to break into a liquid, a particulate dehydrated cross-linked aqueous gel having a size in the range of from about 40 microns to about 500 microns containing an internal temperature activated breaker which causes the gel to break into a liquid, and water present in an amount sufficient to form a slurry. If the cement composition should be foamed to reduce its density or for other reasons, the cement composition can include a gas present in an amount sufficient to form a foam and a mixture of foaming and foam stabilizing surfactants.

It is, therefore, a general object of the present invention to provide improved methods and compositions for forming permeable cement sand screens in well bores Other and further objects, features and advantages of the present invention will be readily apparent to those skilled in the art upon a reading of the description of preferred embodiments which follows.

DESCRIPTION OF THE DRAWINGS

In the drawing, an expandable slotted pipe which can be utilized in accordance with this invention is illustrated.

DESCRIPTION OF PREFERRED EMBODIMENTS

Figure 1:
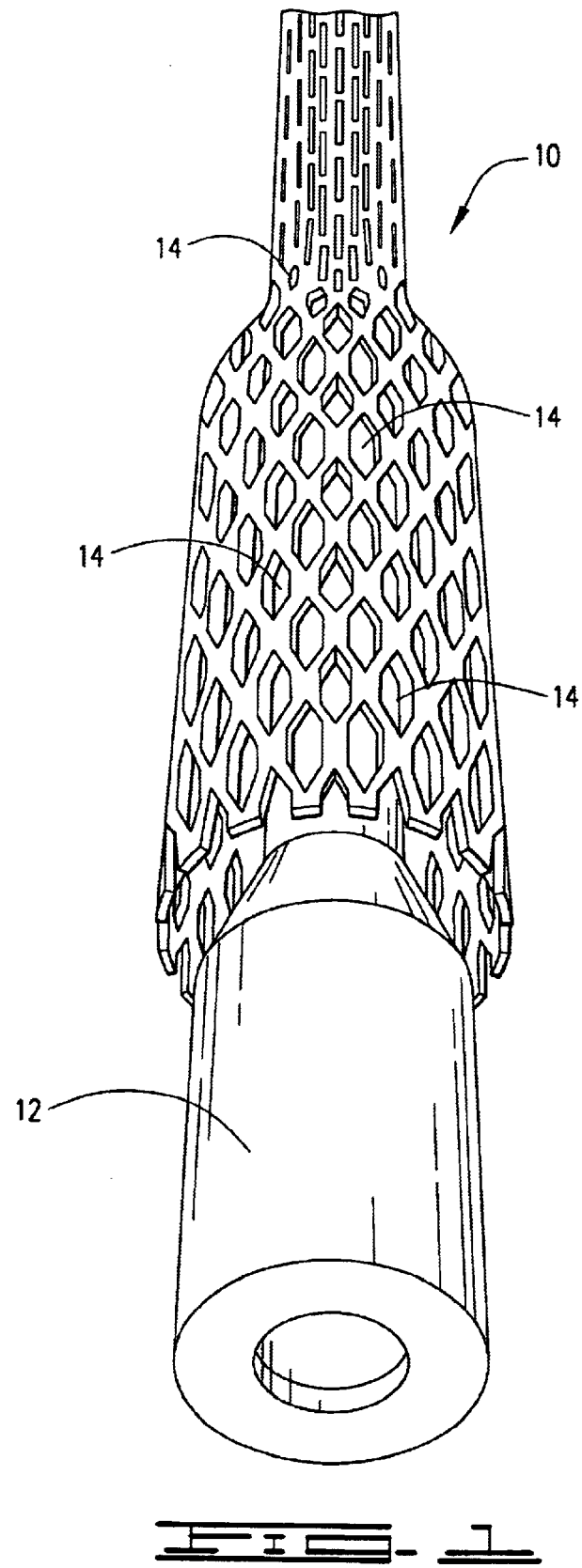

In accordance with the methods of this invention, a permeable cement sand screen is formed in a well bore adjacent to a fluid producing zone whereby loose and incompetent sand and fines are prevented from entering the well bore with the produced fluid. The methods are basically comprised of the following steps. A cement composition is prepared comprised of a hydraulic cement, a particulate cross-linked aqueous gel having a size in the range of from about 100 microns to about 3000 microns containing an internal temperature activated breaker which causes the gel to break into a liquid, a particulate dehydrated cross-linked aqueous gel having a size in the range of from about 40 microns to about 500 microns containing an internal temperature activated breaker which causes the gel to break into a liquid, and water present in an amount sufficient to form a slurry. The cement composition is placed in the well bore adjacent to the fluid producing zone therein, e.g., a zone producing oil and/or gas with or without water. The cement composition fills and forms a column in the well bore adjacent to the fluid producing zone in contact with the walls of the well bore. The cement composition is allowed to set and the particulate cross-linked aqueous gels containing internal temperature activated breakers are allowed to break whereby a permeated set cement composition is formed in the fluid producing zone in the well bore. Thereafter, an acid solution is introduced into the well bore into contact with the permeated set cement whereby the acid solution flows through the permeations in the set cement and dissolves any portions of the set cement blocking the permeations.

When a lightweight permeable cement composition is required, the cement composition placed in the fluid producing zone can be foamed. That is, the cement composition described above can include a gas present in an amount sufficient to form a foam and a mixture of foaming and foam stabilizing surfactants.

Another method of this invention for forming a high strength permeable cement composition sand screen in a cased well bore adjacent to an open-hole fluid producing zone therein below the casing is basically comprised of the following steps. An expandable slotted pipe is placed in the open hole fluid producing zone and the slotted pipe is expanded to the size of the casing in the well bore. A cement composition is prepared comprised of a hydraulic cement, a particulate cross-linked aqueous gel having a size in the range of from about 100 microns to about 3000 microns containing an internal temperature activated breaker which causes the gel to break into a liquid, a particulate dehydrated cross-linked aqueous gel having a size in the range of from about 40 microns to about 500 microns containing an internal temperature activated breaker which causes the gel to break into a liquid, and water present in an amount sufficient to form a slurry. The cement composition is placed in the well bore adjacent to the fluid producing zone within the expanded slotted pipe therein, between the expanded slotted pipe and the open-hole well bore and within voids and/or fractures in the producing zone. The cement composition is then allowed to set and the particulate cross-linked aqueous gels containing internal temperature activated breakers are allowed to break whereby a permeated set cement composition is formed in the open-hole producing zone. The set permeable cement composition is then drilled out within the expanded slotted pipe. Thereafter, an acid solution is introduced by way of the well bore into contact with the permeated set cement whereby the acid solution flows through the permeations in the set cement and dissolves any portions of the set cement blocking the permeations.

As mentioned above, if the cement composition is required to be lightweight, it can include a gas present in an amount sufficient to form a foam and a mixture of foaming and foam stabilizing surfactants. Also, in order to provide a larger annulus between the expanded slotted pipe in the fluid producing zone and the walls of the well bore, the well bore within the fluid producing zone can optionally be enlarged by drilling or hydrojetting prior to placing and expanding the slotted pipe therein.

A variety of hydraulic cements can be utilized in the cement compositions of this invention. Portland cements or their equivalents are generally preferred. Portland cements of the types defined and described in *API Specification For Materials And Testing For Well Cements,* API Specification 10, $5^{th}$ Edition, dated Jul. 1, 1990 of the American Petroleum Institute are particularly suitable. Preferred such API Portland cements include classes A, B, C, G and H with API classes G and H being more preferred, and class H being the most preferred.

The particulate cross-linked aqueous gel having a size in the range of from about 100 microns to about 3000 microns containing an internal temperature activated breaker which causes the gel to break into a liquid is comprised of water, a hydratable polymer, a delayed breaker and a cross-linking agent. Examples of hydratable polymers which can be utilized to form the aqueous gel include, but are not limited to, hydroxyalkylcellulose grafted with vinyl phosphonic acid, acrylic polymers, acrylamide polymers and polysaccharide polymers. Of these, hydroxyalkylcellulose, e.g., hydroxyethylcellulose, grafted with vinyl phosphonic acid is preferred. The temperature activated delayed breakers which can be utilized include, but are not limited to, hemicellulase, encapsulated ammonium persulfate, ammonium persulfate activated with ethanol amines and sodium chlorite. The cross-linking agent can be a Bronsted-Lowry or Lewis base. Examples of such bases include, but are not limited to, calcium oxide, potassium hydroxide triethanolamine, sodium hydroxide and magnesium oxide. Of these, magnesium oxide is preferred.

The particular delayed internal breaker utilized in the cross-linked gel depends on the temperature of the fluid producing zone in which the cement composition is placed. If the temperature is in the range of from about 80° F. to about 125° F., hemicellulase is utilized. If the temperature is in the range of from about 80° F. to about 250° F., encapsulated ammonium persulfate is utilized. If the temperature is in the range of from about 70° F. to about 100° F., ammonium persulfate activated with ethanol amines is used, and if the temperature is in the range of from about 140° F. to about 200° F., sodium chlorite is used.

Generally, the amount of water which can be fresh water or salt water in the particulate cross-linked aqueous gel is in the range of from about 95% to about 99.5% by weight of the cross-linked aqueous gel, the hydratable polymer utilized is present in an amount in the range of from about 0.1% to about 5% by weight of the cross-linked aqueous gel, the internal temperature activated delayed breaker is present in an amount in the range of from about 0.05% to about 0.5% by weight of the cross-linked aqueous gel and the cross-linking agent is present in an amount in the range of from about 0.1% to about 2% by weight of the cross-linked aqueous gel.

The above described aqueous gel having a size in the range of from about 100 microns to about 3000 microns containing an internal temperature activated breaker is prepared by mixing the water with the hydratable polymer utilized. The temperature activated delayed breaker is dissolved in water to form a concentrated solution which is then mixed with the aqueous gel. The cross-linker used is added to the aqueous gel to cross-link the aqueous gel whereby a stiff gel mass is formed. Thereafter, the cross-linked gel is extruded or sheared into particles having a size in the range of from about 100 microns to about 3000 microns. The particulate cross-linked aqueous gel can be stored at ambient temperatures. When the particulate aqueous gel is exposed to the temperature which activates the delayed breaker, the gel breaks into a liquid and permeates the cement composition.

The dehydrated particulated cross-linked aqueous gel having a size in the range of from about 40 microns to about 500 microns containing an internal temperature activated breaker is produced in the same manner and using the same components as described above. After the particulate cross-linked aqueous gel is formed, it is dehydrated and sieved into a dried, solid powder of reduced particle size, i.e., a size in the range of from about 40 microns to about 500 microns.

When the two sizes of particulate cross-linked aqueous gels containing internal temperature activated breakers are combined in the cement composition of this invention, the larger diameter gel particles are generally dispersed internally in the cement composition. The dehydrated aqueous gel particles are of a size similar to or smaller than the cement particles in the cement composition after the dehydrated particles are again hydrated, and a major portion of those gel particles find their way along with cement particles to the interface between the cement composition and the surface of the fluid producing zone. When the smaller gel particles break they produce permeations at the interface which are connected with the permeated matrix produced by the larger size particles.

The particulate cross-linked aqueous gel particles having a size in the range of from about 100 microns to about 3000 microns are included in the cement composition in an amount in the range of from about 10% to about 50% by weight of hydraulic cement in the cement composition. The particulate dehydrated cross-linked aqueous gel particles having a size in the range of from about 40 microns to about 500 microns are included in the cement composition in an amount in the range of from about 5% to about 30% by weight of hydraulic cement in the composition.

The water utilized in the cement composition is selected from the group consisting of fresh water and salt water and is present in the cement composition in an amount in the range of from about 20% to about 50% by weight of hydraulic cement in the composition.

As indicated above, when a lightweight cement composition of this invention is required, a gas which can be air or nitrogen is included in the cement composition along with a mixture of foaming and foam stabilizing surfactants. The gas, preferably nitrogen, is generally present in an amount sufficient to foam the cement composition, i.e., an amount in the range of from about 40% to about 70% by volume of the cement composition.

While various mixtures of foaming and foam stabilizing surfactants can be included in the foamed cement composition, a preferred mixture is comprised of an ethoxylated alcohol ether sulfate surfactant of the formula

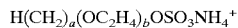
$H(CH_2)_a(OC_2H_4)_bOSO_3NH_4^+$ wherein a is an integer in the range of from about 6 to about 10 and b is an integer in the range of from about 3 to about 10; an alkyl or alkene amidopropylbetaine surfactant having the formula

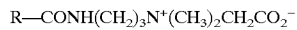
$R-CONH(CH_2)_3N^+(CH_3)_2CH_2CO_2^-$ wherein R is a radical selected from the group of decyl, cocoyl, lauryl, cetyl and olyl; and an alkyl or alkene amidopropyldimethylamine oxide surfactant having the formula

$R-CONH(CH_2)_3N^+(CH_3)_2O^-$ wherein R is a radical selected from the group of decyl, cocoyl, lauryl, cetyl and olyl. The ethoxylated alcohol ether sulfate surfactant is generally present in the mixture in an amount in the range of from about 60 to about 64 parts by weight. The alkyl or alkene amidopropylbetaine surfactant is generally present in the mixture in an amount in the range of from about 30 to about 33 parts by weight and the alkyl or alkene amidopropyldimethylamine oxide surfactant is generally present in the mixture in an amount in the range of from about 3 to about 10 parts by weight. The mixture can optionally include fresh water in an amount sufficient to dissolve the surfactants whereby it can more easily be combined with a cement slurry.

A particularly preferred surfactant mixture for use in accordance with this invention is comprised of an ethoxylated hexanol ether sulfate surfactant present in an amount of about 63.3 parts by weight of the mixture, a cocoylamidopropylbetaine surfactant present in an amount of about 31.7 parts by weight of the mixture and cocoylamidopropyldimethyl amine oxide present in an amount of about 5 parts by weight of the mixture.

The mixture of foaming and foam stabilizing surfactants is generally included in the cement composition of this invention in an amount in the range of from about 1% to about 5% by volume of water in the composition.

The acid solution used for contacting the permeated set cement in the well bore can be any of a variety of aqueous acid solutions. Examples of aqueous acid solutions that can be used include, but are not limited to, aqueous hydrochloric acid solutions, aqueous acetic acid solutions and aqueous formic acid solutions. Generally, an aqueous hydrochloric acid solution containing acid in the range of from about 1% to about 5% by volume is preferred with a 2% by volume hydrochloric acid solution being the most preferred.

As mentioned above, an alternate method of the present invention for forming a permeable cement composition sand screen in a cased well bore adjacent to an open-hole fluid producing zone therein below the casing is basically comprised of the following steps. An expandable slotted pipe is placed in the fluid producing zone and expanded to the size of the casing in the well bore. A cement composition is then prepared comprised of a hydraulic cement, a particulate cross-linked aqueous gel having a size in the range of from about 100 microns to about 3000 microns containing an internal temperature activated breaker which causes the gel to break into a liquid, a particulate dehydrated cross-linked aqueous gel having a size in the range of from about 40 microns to about 500 microns containing an internal temperature activated breaker which causes the gel to break into a liquid, and water present in an amount sufficient to form a slurry. The cement composition is placed in the well bore adjacent to the fluid producing zone within the expanded slotted pipe therein, between the expanded slotted pipe and the open-hole well bore and within voids or fractures in the producing zone. The cement composition is allowed to set and the particulate cross-linked aqueous gels containing internal temperature activated breakers are allowed to break whereby a permeated set cement composition is formed in the open-hole producing zone. The permeated set cement composition within the expanded slotted pipe is drilled out. Thereafter, an aqueous acid solution, e.g., an aqueous hydrochloric, acetic or formic acid solution as described above, is introduced into contact with the permeated set cement whereby the acid solution flows through the permeations in the set cement and dissolves any portions of the set cement blocking the permeations.

An expandable slotted pipe 10 which can be utilized in accordance with this invention is illustrated in FIG. 1 after it has been partially expanded by a mandrel 12. The expandable slotted pipe 10 is preferably formed of high strength ductile steel and includes a series of staggered, overlapping axial slots 14. The staggered, overlapping slots 14 allow for up to about 300% radial expansion. The typical expansion required in accordance with the present invention is about 50% which causes less than about 1% overall contraction in the pipe length. After the expandable slotted pipe 10 is run into the open-hole fluid producing zone, the expanding mandrel 12 is run through the pipe 10 to expand it to the required size. The mandrel 12 can either be pushed or pulled through the slotted pipe 10 and it is preferably of a size such that the internal diameter of the expanded slotted pipe 10 is substantially the same as the internal diameter of the casing above the producing zone. The expanded pipe 10 has numerous large openings for allowing the cement composition to flow therethrough without bridging. The expanded pipe 10 also guides the drill bit and prevents its side tracking when the set cement is drilled out.

The set cement surrounding the expanded slotted pipe 10 acts as a filter to prevent formation sand and fines from migrating into the well bore with produced fluids. The rigid expanded pipe 10 provides high strength to the set cement composition and does not reduce the diameter of the well bore.

A preferred cement composition of this invention for forming a permeable cement sand screen in a well bore is basically comprised of a Portland cement, a particulate cross-linked aqueous gel having a size in the range of from about 100 microns to about 3000 microns, more preferably from about 100 microns to about 1000 microns containing an internal temperature activated breaker which causes the gel to break into a liquid, a particulate dehydrated cross-linked aqueous gel having a size in the range of from about 40 microns to about 500 microns, more preferably from about 40 microns to about 200 microns containing an internal temperature activated breaker which causes the gel to break into a liquid, and water present in an amount sufficient to form a slurry.

The particulate cross-linked aqueous gel having a size in the range of from about 100 microns to about 3000 microns or smaller containing an internal temperature activated breaker is preferably comprised of water, a hydratable polymer comprised of hydroxyethylcellulose grafted with vinyl phosphonic acid, a delayed breaker selected from the group consisting of hemicellulase, encapsulated ammonium persulfate, ammonium persulfate activated with ethanol amines and sodium chlorite and a cross-linking agent comprised of magnesium oxide.

The particulate dehydrated cross-linked aqueous gel having a size in the range of from about 40 microns to about 500 microns or smaller containing an internal temperature activated breaker is preferably comprised of a dehydrated cross-linked aqueous gel consisting of hydroxyalkylcellulose grafted with vinyl phosphonic acid, a delayed breaker selected from the group consisting of hemicellulase, encapsulated ammonium persulfate, ammonium persulfate activated with ethanol amines and sodium chlorite and a cross-linking agent comprised of magnesium oxide.

The particulate cross-linked aqueous gel having a size in the range of from about 100 microns to about 3000 microns or smaller is preferably present in the cement composition in an amount in the range of from about 20% to about 50% by weight of hydraulic cement in the composition, more preferably in an amount in the range of from about 20% to about 40% and most preferably in an amount of about 30%. The dehydrated particulate cross-linked aqueous gel having a size in the range of from about 40 microns to about 500 microns or smaller is preferably present in the cement composition in an amount in the range of from about 5% to about 30% by weight of hydraulic cement in the composition, more preferably in an amount in the range of from about 10% to about 25% and most preferably in an amount of about 20%.

As mentioned above, the cement composition of this invention which forms a permeable cement sand screen in a well bore can be foamed by including a gas, preferably nitrogen, in the cement composition in an amount sufficient to form a foam and a mixture of foaming and foam stabilizing surfactants in an amount sufficient to facilitate a foam and stabilize it.

In order to further illustrate the methods and compositions of this invention, the following example is given.

EXAMPLE

An internal breaker comprised of ter-butyl hydroperoxide and copper chelate EDTA in a 5% solution of a polymer of hydroxyethylcellulose grafted with vinyl phosphonic acid was prepared. The hydrated polymer was then cross-linked with magnesium hydroxide. The resulting cross-linked gel was graded into small particulate in a Waring blender.

API Portland Class H cement was blended with fresh water in a Waring blender while stirring at moderate speed. The amount of water was about 40% by weight of cement. The particulate cross-linked gel in the amount of 30% by weight of cement was then added to the cement slurry. The cement slurry was stirred at high speed for 20 seconds. The slurry was then poured into Teflon sleeves and placed in an oven to be cured at 150° F. for 48 hours. Some samples were cured under stress loads.

Cement cores were obtained by extruding from the Teflon sleeves. Each core plug having dimensions of 2 inches in length and 15/16 inch in diameter was placed in a fluid loss cell equipped with a core holder and the initial permeability of the core was determined using a solution of 2% KCl. Thereafter, a 1 to 5% HCl solution or a 5% acetic acid solution was flowed through the core. Following the acid treatment, the final permeability of each core was determined using a solution of 2% KCl. The results of the permeability measurements are presented in the Table below.

TABLE I

| Sample | Stress Load During Curing | Acid Type | Initial Permeability | Final Permeability |
|---|---|---|---|---|
| 1 | 0 | 5% HCl | 4.7 D[1] | 42.6 D |
| 2 | 0 | 5% Acetic | 16.7 D | 29 D |
| 3 | 0 | 2% HCl | 8.2 D | 73.6 D |
| 4 | 0 | 2% HCl | 8.2 D | 75.7 D |
| 5 | 0 | 1% HCl | 4.3 D | 86 D |
| 6 | 250 psi | 2% HCl | 94 mD[2] | 52 D |
| 7 | 500 psi | 2% HCl | 3.6 mD | 6.4 D |
| 8 | 1000 psi | 1% HCl | 0.45 mD | 0.24 mD |

[1]Darcies
[2]Millidarcies

From the Table above, it can be seen that the methods and compositions of this invention produce a permeable set cement composition useful as a well bore sand screen.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of forming a permeable cement composition sand screen in a well bore adjacent to a fluid producing zone therein comprising the steps of:
    (a) preparing a cement composition comprised of a hydraulic cement, a particulate cross-linked aqueous gel having a size in the range of from about 100 microns to about 3000 microns containing an internal temperature activated breaker which causes said gel to break into a liquid, a particulate dehydrated cross-linked aqueous gel having a size in the range of from about 40 microns to about 500 microns containing an internal temperature activated breaker which causes said gel to break into a liquid, and water present in an amount sufficient to form a slurry;
    (b) placing said cement composition prepared in step (a) in said well bore adjacent to said fluid producing zone therein and allowing said cement composition to set and said particulate cross-linked aqueous gels containing internal temperature activated breakers to break whereby a permeated set cement composition is formed in the fluid producing zone in said well bore; and
    (c) introducing an aqueous acid solution into contact with said permeated set cement composition whereby the aqueous acid solution flows through the permeations in said set cement composition and dissolves any portions of said set cement composition blocking said permeations.

2. The method of claim 1 wherein said hydraulic cement in said cement composition is Portland cement or the equivalent.

3. The method of claim 1 wherein said particulate cross-linked aqueous gel in said composition having a size in the range of from about 100 microns to about 3000 microns containing an internal temperature activated breaker is comprised of water, a hydratable polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

4. The method of claim 3 wherein said hydratable polymer is hydroxyethylcellulose grafted with vinyl phosphonic acid.

5. The method of claim 3 wherein said cross-linking agent is magnesium oxide.

6. The method of claim 1 wherein said particulate cross-linked aqueous gel having a size in the range of from about 100 microns to about 3000 microns containing an internal temperature activated breaker is present in said cement composition in an amount in the range of from about 10% to about 50% by weight of hydraulic cement in said composition.

7. The method of claim 1 wherein said dehydrated particulate cross-linked aqueous gel in said composition having a size in the range of from about 40 microns to about 500 microns containing an internal temperature activated breaker is comprised of a dehydrated cross-linked aqueous gel comprised of a polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

8. The method of claim 7 wherein said hydratable polymer is hydroxyethylcellulose grafted with vinyl phosphonic acid.

9. The method of claim 7 wherein said cross-linking agent is magnesium oxide.

10. The method of claim 1 wherein said particulate dehydrated cross-linked aqueous gel having a size in the range of from about 40 microns to about 500 microns containing an internal temperature activated breaker is present in said cement composition in an amount in the range of from about 5% to about 30% by weight of hydraulic cement in said composition.

11. The method of claim 1 wherein said water in said composition is selected from the group consisting of fresh water and salt water.

12. The method of claim 1 wherein said water is present in said composition in an amount in the range of from about 20% to about 50% by weight of cement in said composition.

13. The method of claim 1 wherein said cement composition prepared in accordance with step (a) further comprises a gas present in an amount sufficient to form a foam and a mixture of foaming and foam stabilizing surfactants.

14. The method of claim 13 wherein said gas in said composition is selected from the group consisting of air and nitrogen.

15. The method of claim 13 wherein said mixture of foaming and foam stabilizing surfactants in said composition is comprised of ethoxylated hexanol ether sulfate, cocoylamidopropylbetaine and cocoylamidopropyldimethylamine oxide.

16. The method of claim 13 wherein said mixture of foaming and foam stabilizing surfactants is present in said composition in the range of from about 1% to about 5% by volume of water in said composition.

17. A method of forming a permeable cement composition sand screen in a cased well bore adjacent to an open-hole fluid producing zone therein below the casing comprising the steps of:
    (a) placing an expandable slotted pipe in said fluid producing zone;
    (b) expanding said slotted pipe to the size of said casing in said well bore;

(c) preparing a cement composition comprised of a hydraulic cement, a particulate cross-linked aqueous gel having a size in the range of from about 100 microns to about 3000 microns containing an internal temperature activated breaker which causes said gel to break into a liquid, a particulate dehydrated cross-linked aqueous gel having a size in the range of from about 40 microns to about 500 microns containing an internal temperature activated breaker which causes said gel to break into a liquid, and water present in an amount sufficient to form a slurry;

(d) placing said cement composition prepared in step (c) in said well bore adjacent to said fluid producing zone within said expanded slotted pipe therein, between said expanded slotted pipe and said open-hole well bore and within voids or fractures in said producing zone;

(e) allowing said cement composition to set and said particulate cross-linked aqueous gels containing internal temperature activated breakers to break whereby a permeated set cement composition is formed in said open-hole producing zone;

(f) drilling out said set cement composition within said expanded slotted pipe; and (g) introducing an aqueous acid solution into contact with said permeated set cement composition whereby the aqueous acid solution flows through the permeations in said set cement composition and dissolves any portions of said set cement composition blocking said permeations.

18. The method of claim 17 which further comprises the step of enlarging the diameter of said open-hole producing zone prior to placing said expandable slotted pipe in said fluid producing zone in accordance with step (a).

19. The method of claim 17 wherein said hydraulic cement in said cement composition is Portland cement or the equivalent.

20. The method of claim 17 wherein said particulate cross-linked aqueous gel in said composition having a size in the range of from about 100 microns to about 3000 microns containing an internal temperature activated breaker is comprised of water, a hydratable polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

21. The method of claim 20 wherein said hydratable polymer is hydroxyethylcellulose grafted with vinyl phosphonic acid.

22. The method of claim 20 wherein said cross-linking agent is magnesium oxide.

23. The method of claim 17 wherein said particulate cross-linked aqueous gel having a size in the range of from about 100 microns to about 3000 microns containing an internal temperature activated breaker is present in said cement composition in an amount in the range of from about 10% to about 50% by weight of hydraulic cement in said composition.

24. The method of claim 17 wherein said dehydrated particulate cross-linked aqueous gel in said composition having a size in the range of from about 40 microns to about 500 microns containing an internal temperature activated breaker is comprised of a dehydrated cross-linked aqueous gel comprised of a polymer selected from the group consisting of hydroxyalkylcellulose grafted with vinyl phosphonic acid, acrylic polymers, acrylamide polymers and polysaccharide polymers, a delayed breaker selected from the group consisting of hemicellulase, encapsulated ammonium persulfate, ammonium persulfate activated with ethanol amines and sodium chlorite, and a cross-linking agent comprised of a Bronsted-Lowry or Lewis base.

25. The method of claim 24 wherein said hydratable polymer is hydroxyethylcellulose grafted with vinyl phosphonic acid.

26. The method of claim 24 wherein said cross-linking agent is magnesium oxide.

27. The method of claim 17 wherein said particulate dehydrated cross-linked aqueous gel having a size in the range of from about 40 microns to about 500 microns containing an internal temperature activated breaker is present in said cement composition in an amount in the range of from about 5% to about 30% by weight of hydraulic cement in said composition.

28. The method of claim 17 wherein said water in said composition is selected from the group consisting of fresh water and salt water.

29. The method of claim 17 wherein said water is present in said composition in an amount in the range of from about 20% to about 50% by weight of cement in said composition.

30. The method of claim 17 wherein said cement composition prepared in accordance with step (a) further comprises a gas present in an amount sufficient to form a foam and a mixture of foaming and foam stabilizing surfactants.

31. The method of claim 30 wherein said gas in said composition is selected from the group consisting of air and nitrogen.

32. The method of claim 30 wherein said mixture of foaming and foam stabilizing surfactants in said composition is comprised of ethoxylated hexanol ether sulfate, cocoylamidopropylbetaine and cocoylamidopropyldimethylamine oxide.

33. The method of claim 30 wherein said mixture of foaming and foam stabilizing surfactants is present in said composition in the range of from about 1% to about 5% by volume of water in said composition.

* * * * *